Aug. 13, 1935.  C. F. BRUCE ET AL  2,010,913
DOUBLE PURPOSE THREADING DIE
Filed April 12, 1934
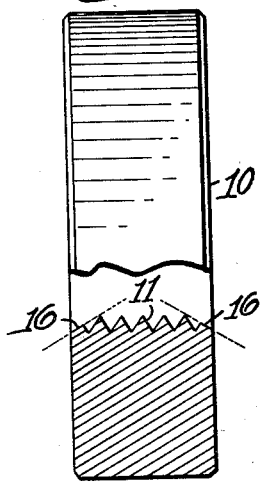
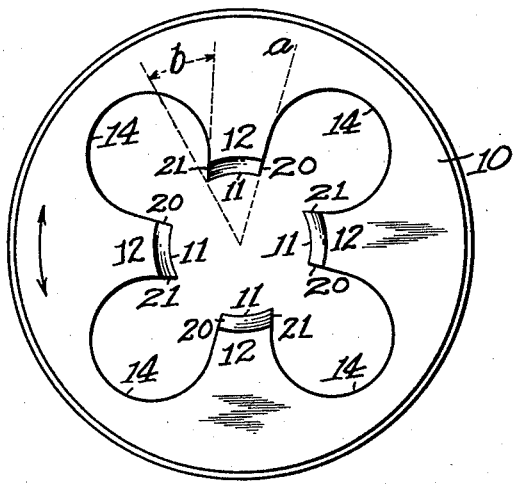
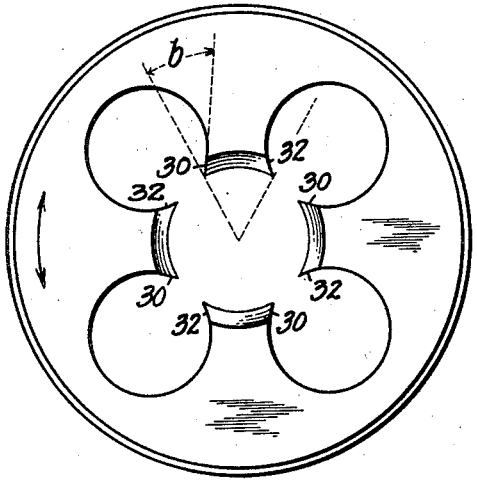
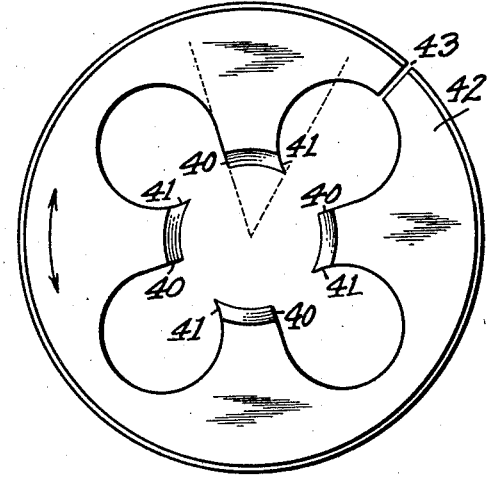
Inventors
Chester F. Bruce
Rollin S. Bascom
By Attorneys Patented Aug. 13, 1935

2,010,913

UNITED STATES PATENT OFFICE 2,010,913

DOUBLE PURPOSE THREADING DIE

Chester F. Bruce and Rollin S. Bascom, Greenfield, Mass., assignors to Greenfield Tap & Die Corporation, Greenfield, Mass., a corporation of Massachusetts Application April 12, 1934, Serial No. 720,263

4 Claims. (Cl. 10—111)

This invention relates to dies for cutting screw threads on cylindrical work.

It is recognized in metal cutting trades that the angle or rake of the edge of a cutting tool should be selectively adapted to the material to be machined.

It is the general object of our invention to provide a threading die in which the cutting angle or rake of the cutting teeth at one side of each land is substantially different from the angle or rake of the cutting teeth at the opposite side of said land, whereby the die is adapted for use on different metals.

A further object of our invention is to provide a threading die in which both sides of the die have an entrance chamfer, so that the die may be reversely faced and operated.

Our invention further relates to arrangements and combinations of parts which will be hereinafter described and more particularly pointed out in the appended claims.

Preferred forms of the invention are shown in the drawing, in which

Fig. 1 is a front elevation of a die embodying our improvements;

Fig. 2 is a side elevation thereof, partly in section, and

Figs. 3 and 4 are views similar to Fig. 1 but showing modified constructions.

Referring to Figs. 1 and 2, we have shown a threading die 10 having cutting teeth 11 formed on successive parallel lands 12. The lands 12 are separated by the usual clearance spaces 14 in which chips may fall during a threading operation.

The end cutting edges 20 at one side of each land are disposed in radial planes, as clearly indicated by the broken line $a$ in Fig. 1, while the end cutting edges at the opposite side of each land are disposed in a plane forming an angle $b$ with a radial plane passing through said cutting edges. This angle $b$ is commonly called the "angle of rake" and causes each cutting edge to act somewhat as a wedge in removing a chip or shaving from the work.

The cutting teeth are chamfered at each face of the die, as clearly indicated at 16 in Fig. 2, so that either face of the die may be presented toward the work and so that the work may be caused to enter the die from either direction.

Our improved die is thus reversible and either side of each land may be made operative. By providing different angles at the opposite sides of the lands, our improved die is well adapted to cut certain materials when faced in one direction and to cut different materials when faced oppositely. For example, the substantially radial cutting edges 20 (Fig. 1) are particularly adapted for cutting brass, cast iron or malleable iron, while the straight rake provided at the edges 21 of the cutting teeth is particularly adapted for cutting certain kinds of steel.

We have thus provided in a single die cutting teeth selectively adapted for operation on substantially different kinds of material, an important advantage over the usual die which is adapted only to a single purpose and material.

In Fig. 3 we have shown the edges 30 of the teeth as provided with an angle of rake similar to the angle $b$ in Fig. 1, but the opposite cutting edges 32 are given a curved or hook shape which provides an increased angle of rake at the extreme cutting points. These hook-shaped teeth are particularly adapted for cutting such metals as aluminum and copper.

In Fig. 4 we have shown teeth provided with radial faces 40 at one side of each land and hook-shaped edges 41 at the opposite side. In Fig. 4 we have also indicated the die 42 as being slotted at 43 to permit adjustment. It will be understood that similar slots may be provided in the dies shown in Figs. 1 and 3 if so desired.

We thus present a double-purpose or combination die provided with two sets of cutting edges properly designed for cutting two substantially different kinds of metal. By the use of these dies easier operation and a better quality of work is attained.

Having thus described our invention and the advantages thereof, we do not wish to be limited to the details herein disclosed, otherwise than as set forth in the claims, but what we claim is:—

1. A double purpose die having cutting teeth disposed in parallel lands, the teeth in each land having the end cutting edges at one side of said land disposed at a cutting angle particularly effective for cutting one kind of metal and having the end cutting edges at the other side of said land disposed at a substantially different cutting angle particularly effective for cutting a different kind of metal.

2. A double purpose die having cutting teeth disposed in parallel lands, the teeth in each land having end cutting edges at one side of said land disposed in a surface providing a substantial hook for said edges, said end cutting edges being thereby rendered effective to cut copper and aluminum, and said teeth having end cutting edges at the other side of said land disposed in a plane forming a substantially different cutting angle and effective to cut a different kind of metal.

3. A double purpose die having cutting teeth disposed in parallel lands, the teeth in each land having the end cutting edges at one side of said land disposed substantially in a radial plane and effective to cut cast iron and having the end cutting edges at the other side of said land disposed in a surface providing a substantial hook for said edges, said latter cutting edges being thereby rendered effective to cut copper and aluminum.

4. A double purpose die having cutting teeth disposed in parallel lands, the teeth in each land having the end cutting edges at one side of said land disposed substantially in a radial plane and effective to cut cast iron and having the end cutting edges at the other side of said land disposed in a plane forming a substantial angle of rake with a radial plane through said cutting edges, said latter cutting edges being thereby rendered effective to cut a different kind of metal.

CHESTER F. BRUCE.
    ROLLIN S. BASCOM.